(No Model.) 6 Sheets—Sheet 1.
S. V. KENNEDY.
GRAIN BINDING HARVESTER.

No. 376,199. Patented Jan. 10, 1888.

Witnesses:
M. L. Adams.
R. C. Howes.

Inventor:
Samuel V. Kennedy,
Per Edw. E. Quimby
atty.

(No Model.) 6 Sheets—Sheet 2.
S. V. KENNEDY.
GRAIN BINDING HARVESTER.

No. 376,199. Patented Jan. 10, 1888.

(No Model.) S. V. KENNEDY. 6 Sheets—Sheet 3.
GRAIN BINDING HARVESTER.
No. 376,199. Patented Jan. 10, 1888.
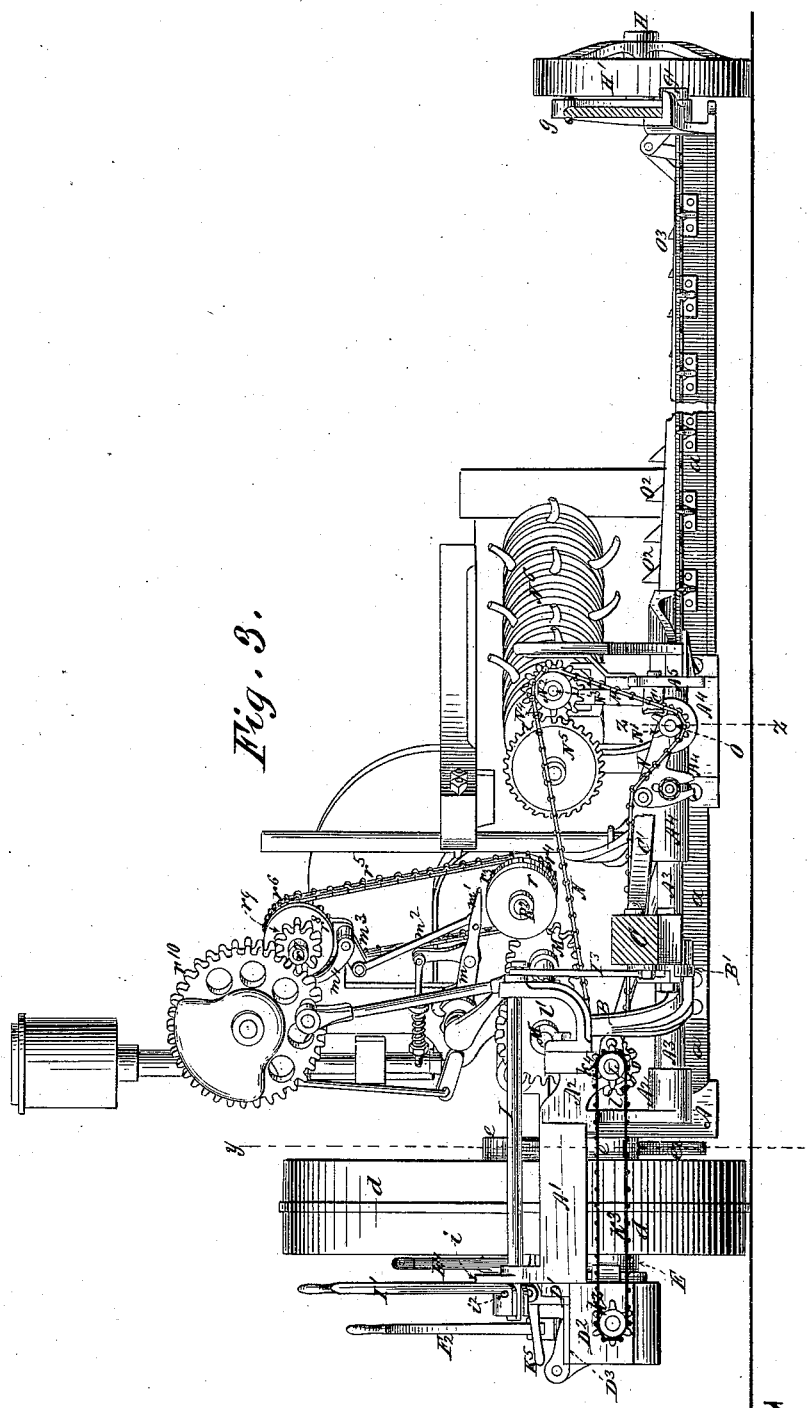

(No Model.) 6 Sheets—Sheet 4.
S. V. KENNEDY.
GRAIN BINDING HARVESTER.

No. 376,199. Patented Jan. 10, 1888.

Witnesses:
M. L. Adams
R. C. Howee

Inventor:
Samuel V. Kennedy,
Per Edw. E. Lumby,
Atty.

(No Model.) 6 Sheets—Sheet 5.
S. V. KENNEDY.
GRAIN BINDING HARVESTER.

No. 376,199. Patented Jan. 10, 1888.

(No Model.) 6 Sheets—Sheet 6.
S. V. KENNEDY.
GRAIN BINDING HARVESTER.
No. 376,199. Patented Jan. 10, 1888.
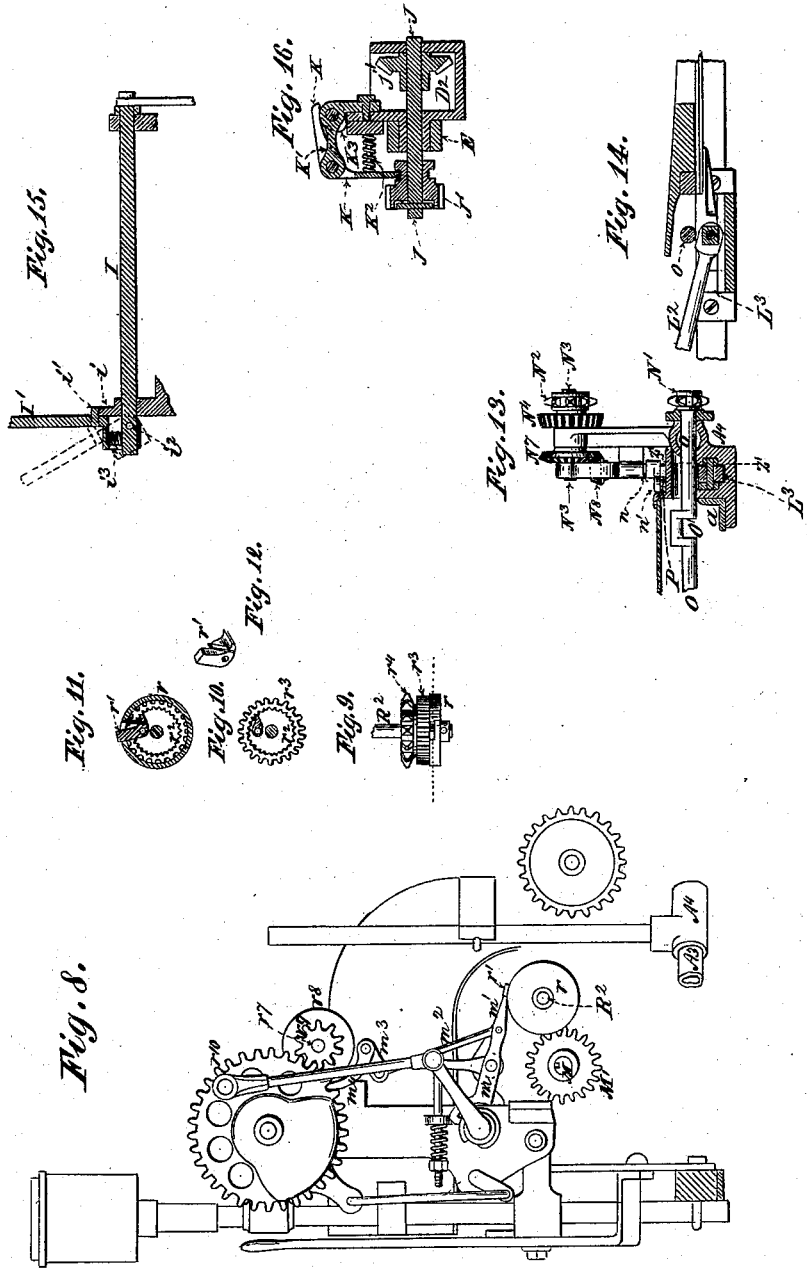

UNITED STATES PATENT OFFICE.

SAMUEL V. KENNEDY, OF MINNEAPOLIS, MINNESOTA, ASSIGNOR TO THE MINNEAPOLIS HARVESTER WORKS, OF SAME PLACE.

GRAIN-BINDING HARVESTER.

SPECIFICATION forming part of Letters Patent No. 376,199, dated January 10, 1888.

Application filed May 18, 1885. Serial No. 165,849. (No model.)

*To all whom it may concern:*

Be it known that I, SAMUEL V. KENNEDY, of Minneapolis, in the county of Hennepin and State of Minnesota, have invented certain Improvements in Grain-Binding Harvesters, of which the following is a specification.

My improvements relate to the construction of the main frame and platform of a harvester; to the devices for suspending the frame upon the drive wheel, and adjusting the drive-wheel relatively to the counter-shaft carrying the pinion which engages the drive-wheel gear; to the devices for raising and lowering the platform; to the mode of transmitting from the drive-wheel the power to actuate the various moving parts of the machine; to a butt-driver vibrating upon an orbitally-moving vertical axis, and, in connection with the platform conveyers, a diagonally-arranged spider-cylinder for moving the cut grain from the platform upward toward the binder-deck to a point within the range of movement of vibrating packer-arms for collecting and forming the gavel; and, finally, to devices by means of which the packer-arms, when the packing mechanism is tripped out of gear, are brought to rest in such positions as not to obstruct the path through which the flow of grain is maintained by the rotation of the spider-cylinder.

The accompanying drawings illustrate my improvements embodied in a low-down grain-binding harvester in which the cut grain is turned upon the platform and is fed to a diagonally-arranged binder, by which it is formed into bundles and discharged upon the ground in the rear of the drive-wheel.

Figure 1:
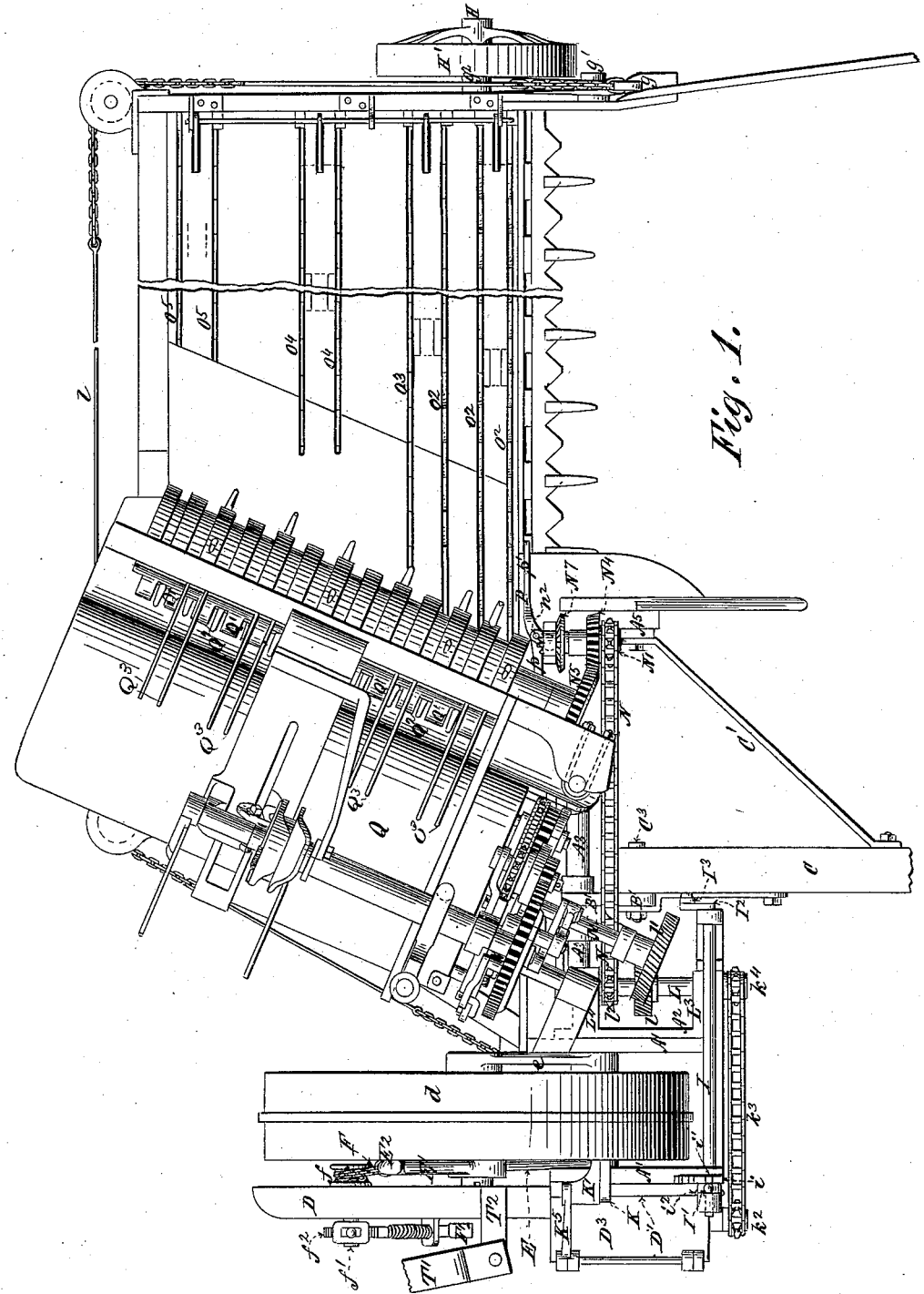
Figure 2:
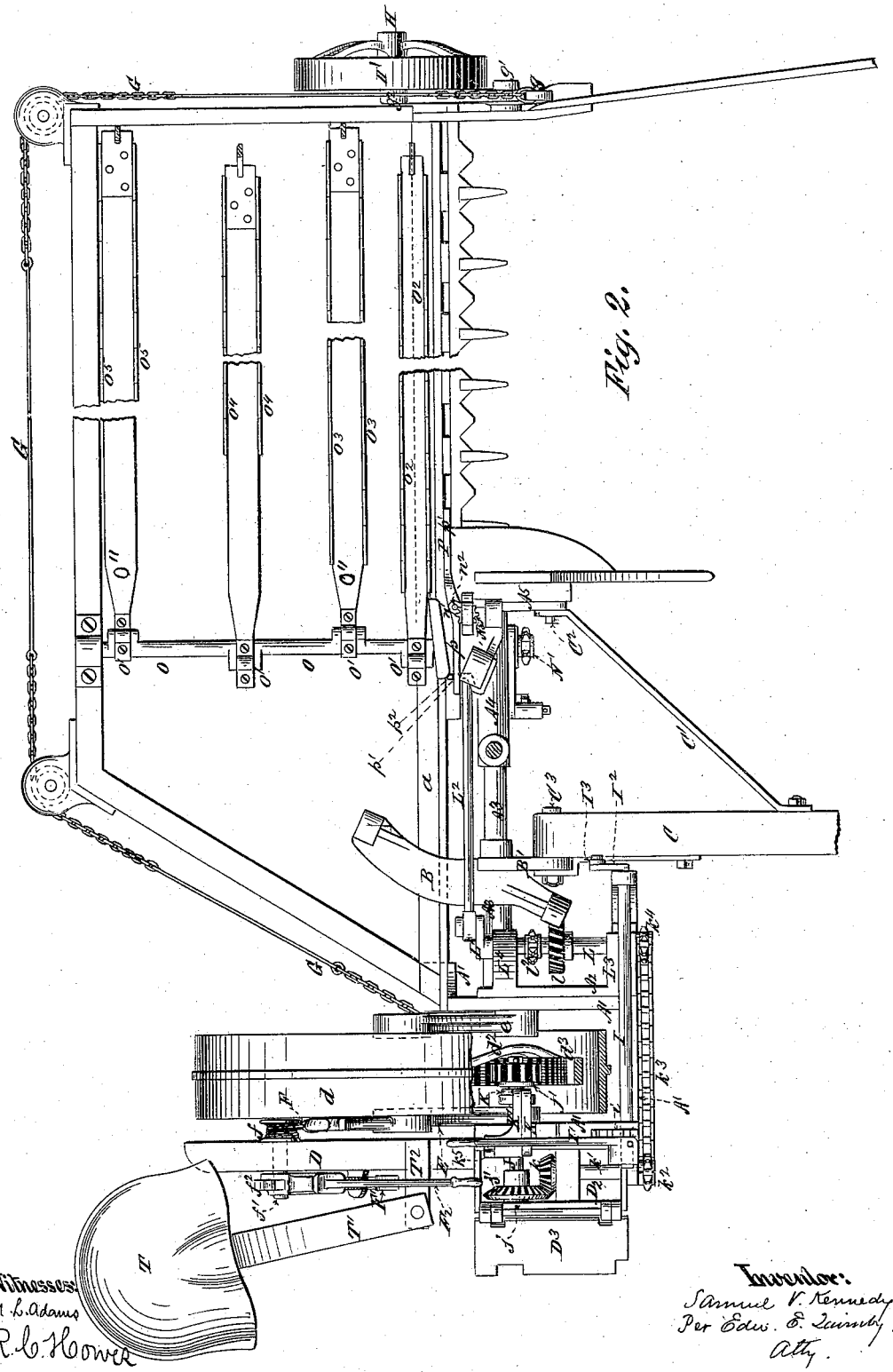
Figures 4, 5:
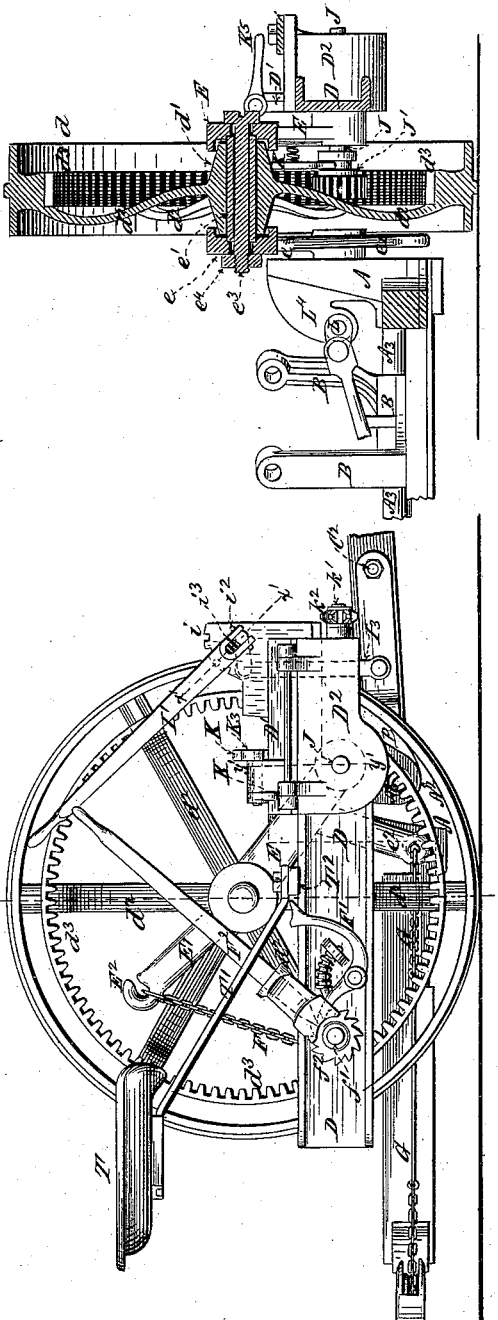
Figure 7:
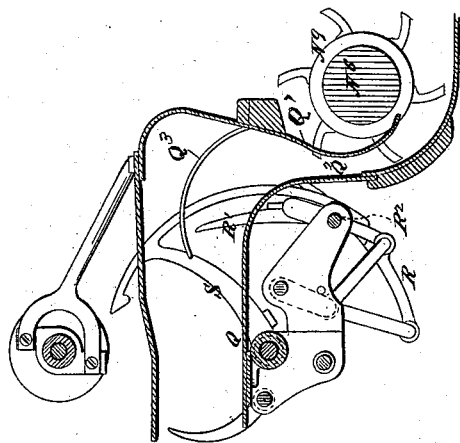
Figure 6:
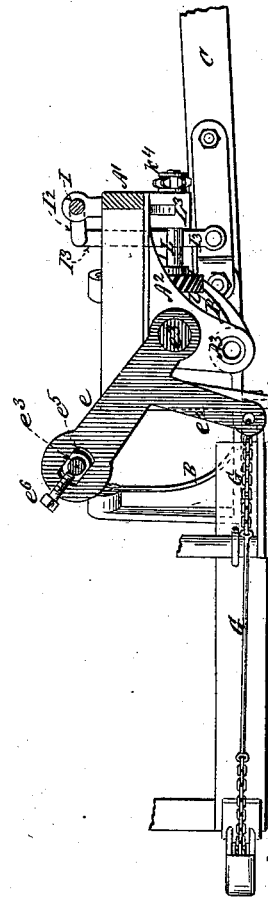

Figure 1 is a top view. Fig. 2 is a top view, partly in section, and with the binding and packing mechanisms removed. Fig. 3 is a front elevation. Fig. 4 is an elevation of the stubble side of the machine. Fig. 5 is a vertical section through the line $x\,x$ on Fig. 4, showing the drive-wheel, the main frame, and the portion of the platform adjoining the drive-wheel. Fig. 6 is a vertical section taken through the line $y\,y$ on Fig. 3, showing the stubble side of the platform in elevation. Fig. 7 is a transverse vertical section of the spider-wheel and adjoining portion of the binder-deck, showing the packer-arms in the position in which they are brought to rest when the binding mechanism is tripped into gear. Fig. 8 is a front elevation of the gearing which drives the packing and binding mechanisms, showing the devices for tripping those mechanisms into and out of gear. Figs. 9, 10, 11, and 12 are detail drawings illustrating the construction of the ratchet-and-pawl gearing for alternately transmitting motion to the packer-shaft and to the pinion which drives the binding mechanism. Fig. 13 is a vertical section taken through the line $z\,z$ on Fig. 3, showing in elevation the vertical crank-shaft which vibrates the butt-hastener and the gearing which drives it; also showing a portion of the horizontal crank-shaft which vibrates the platform conveyers, and exhibiting in cross-section the guide for the grain end of the pitman which operates the sickle-bar. Fig. 14 is a vertical section through the line $z'\,z'$ on Fig. 13, showing in elevation the grain end of the pitman which drives the sickle-bar. Fig. 15 is a central longitudinal section of the rock-shaft 1 and its bearings, and the radius-bar I' for operating the rock-shaft I for the purpose of changing the tilt of the machine, the section being taken through the line $x'\,x'$ on Fig. 4. Fig. 16 is a vertical section through the line $y'\,y'$ on Fig. 4, showing the counter-shaft J in longitudinal section, and the adjustable clutch for throwing the pinion J' into and out of mesh with the drive-wheel gear.

In the machine illustrated in the drawings the platform is rhomboidal in shape, its stubble side forming an acute angle with the front sill and an obtuse angle with the rear sill. The main frame is connected with the part of the front sill extending from the first guard to the stubble end of the sill which is nearer the drive-wheel. The more elevated portion of the main frame extends across in front of and partially embraces the drive-wheel.

The front sill, $a$, is made of angle-iron, and its stubble end is firmly bolted upon the foot of a standard or leg, A, which is cast in one piece with a horizontal U-shaped frame, A', the legs of which extend rearwardly on opposite sides of the portion of the drive-wheel forward of the axle. Another standard or bracket, A², is bolted to the grain side of the U-shaped frame, and at its lower extremity is secured to the stubble end of the horizontal tubular girder A³, the grain end of which is secured to the base of the bevel gear-frame A⁴, the rear side of which is bolted to the front sill, a. The tubular girder A³ is also connected with the sill a by means of the vertical U-shaped frame B, to the base of which the girder A³ and the sill a are appropriately secured. The upper ends of the legs of the U-shaped frame B afford the bearings for the diagonally-arranged prime shaft of the packing and binding mechanisms.

The portion of the base of the frame B which is secured to the tubular girder A³ is provided with a forwardly-projecting ear, B', to the side of which is pivoted the rear end of the pole C. The pole C is provided with a diagonal brace, C', which at its rear end is pivotally connected with a standard, A⁵, cast upon the bevel gear-frame A⁴ by means of the bolt C², which is in alignment with the bolt C³, by which the rear end of the pole is connected with the ear B'.

A horizontal beam, D, is provided upon its upper side with an upwardly-projecting flange, D', extending from its front end rearward a distance equal to the length of the U-shaped frame A', to which this flange is securely bolted, and there is cast upon the outer side of the front portion of the beam D the gear-chest D², provided with the hinged cover D³.

The main frame is supported upon the drive-wheel d by means of pivotal connections with the free ends of the links or crank-arms E e, which are affixed to the opposite ends of the axle e', upon which the drive-wheel turns, and which extend threfrom in a more or less downwardly-inclined direction, according to the height to which the platform is elevated.

The crank-arm E, upon the stubble end of the axle e', is provided with a radial extension, E', terminating in a hook, E², to which the windlass-chain F is attached. The chain F extends down to the windlass-drum f, affixed to the inner end of the windlass-shaft f', which extends transversely through the beam D, and is provided upon its stubble end with the ratchet-wheel f², which is adapted to be engaged by the usual adjustable retaining-pawl, F', and also by the usual actuating-pawl, F², by means of which the windlas is turned to wind up the windlass-chain F.

The crank-arm e upon the grain side of the drive-wheel is provided with a downwardly-projecting branch, e², to the lower end of which is affixed a chain, G, which is led over suitable guide-pulleys horizontally around the rear of the platform, and along the grain side of the platform to the end of the upright arm g of a bell-crank lever, pivoted at its elbow g' to the grain side of the platform, and having the end of its rearwardly-extending arm g² affixed to the axle H of the grain-wheel H'. By this mode of organization the platform and main frame are flexibly suspended, and are lowered with a uniform motion when the windlass-chain F is unwound from the windlass-drum f, and are correspondingly elevated when the windlass is so turned as to wind up the chain F.

The tilt of the machine is regulated by means of a rock-shaft, I, which extends horizontally across in front of the drive-wheel, and is provided at its stubble end with the radius-bar I', within reach of the driver, and at its grain end with a crank, I², linked by means of the pitman I³ with the pole. When the radius-bar I' is pushed backward, the rear end of the pole is lowered, and the front of the platform, with which the pole is pivotally connected, is correspondingly lowered. When the radius-bar I' is moved forward, the rear end of the pole and the front of the platform are correspondingly elevated.

A quadrantal rack, i, rigidly affixed to a vertical flange upon the stubble side of the U-shaped frame A', is adapted for engaging a tooth, i', projecting laterally from the side of the radius-bar I', and thereby holding the rock-shaft I stationary and preserving the angle of inclination to which the platform may have been adjusted.

The lower end of the radius-bar I', which is bifurcated, embraces the rock-shaft I, and is pivotally connected thereto by means of the transverse pin i², and the radius-bar I' is thereby given a sufficient range of swaying motion in a plane parallel with the axis of the rock-shaft I to permit the tooth i' to be seated in or disengaged from either of the recesses in the quadrantal rack i. An expanding spiral spring, i³, bearing at one end upon the rock-shaft I and at the other end upon the bottom of the groove in the bifurcated end of the radius-bar I', tends to hold the radius bar I' in an upright position, and to thereby prevent the accidental swaying outward of the radius-bar and the consequent dislodgment of the tooth i' from the quadrantal rack.

The crank-arm E is transversely perforated at its free end to admit the counter shaft J, which serves as the pivotal connection of the crank-arm E with the main frame, and is in alignment with the pivot e³, by which the crank-arm e is connected with the standard A².

The drive-wheel d is provided with the hollow hub d', from which radiate the spokes d² d², which are curved, as shown, to afford clearance for the pinion J', which is loosely mounted upon the inner end of the counter-shaft J, and is rotated by the inside gear, d³, affixed to the drive-wheel.

The construction of the drive-wheel axle and the mode of adjustably fastening the links E and e thereto will be found illustrated in Figs. 5 and 6, on reference to which it will be seen that the axle e' of the drive-wheel is hollow, and is slightly longer than the hub of the drive-wheel, and has its ends flattened. The inner faces of the hubs of the links E and e are provided with recesses the sides of which bear against the flattened sides of the hollow axle e', as shown in Fig. 6. The hubs of the links E and e are clamped against the ends of the axle $e'$ by means of the central bolt, $e^3$, the head of which bears against the exterior face of the hub of the link E, while its nut $e^4$ bears against the exterior face of the hub of the link $e$. Each of the hubs of the links E and $e$ is provided with a slotted hole to admit the bolt $e^3$. One of these slotted holes, $e^5$, is shown in Fig. 6, and in the hub of each of the links there is inserted in a radial direction an inclined adjusting-screw, $e^6$, the inner end of which bears upon the bolt $e^3$. By slightly loosening the nut $e^4$ and turning the adjusting-screw $e^6$ in or out, as the case may be, the depth of mesh of the pinion J' with the drive-wheel gear $d^3$ may be regulated, as desired.

The weight of the machine will cause the bolt $e^3$ to bear against the inner ends of the adjusting-screws $e^6$, and when the proper adjustment is made the tightening of the nut $e^4$ will securely clamp the links to the end of the hollow axle $e'$.

A perforation in the beam D affords one bearing for the shaft J, and another bearing is provided for the shaft J in the standard $j$, erected upon the bottom of the gear-chest $D^2$.

At its stubble end the shaft J has affixed to it the bevel-wheel $j'$, which is adapted to engage a bevel-pinion, $k$, affixed to the rear end of the horizontal shaft $k'$.

Endwise motion is imparted to the pinion J', for the purpose of effecting the engagement or disengagement of shoulders formed in or upon the inner side of the pinion J', with a pin inserted transversely through the shaft J by means of the bell-crank lever K, pivoted to the inner end of the horizontal arm K'.

The downwardly-projecting arm of the bell-crank lever K is bifurcated, and engages a circumferential groove in the hub of the pinion J'. An expanding spiral spring, $K^2$, bearing at one end upon the inner side of the outer leg of the U-shaped frame A' and at the other end against the downwardly-projecting arm of the bell-crank lever K, tends to force the pinion J' inward, and thus maintains it in engagement with the transverse pin in the shaft J. The disengagement of the pinion J' from this transverse pin, and consequently from the shaft J, is accomplished by raising the horizontal arm of the bell-crank lever K, by which operation the pinion J' is moved toward the stubble side of the machine. The raising of the horizontal arm of the bell-crank lever K is conveniently effected by means of a cam, $K^3$, affixed to the forward end of a horizontal rock-shaft provided upon its rear end with the radial arm $K^5$.

The horizontal shaft $k'$ projects through the front of the gear-chest $D^2$, and has affixed to its outer end the sprocket-wheel $k^2$, for engaging a sprocket-chain, $k^3$, which also engages the sprocket-wheel $k^4$, affixed to the front end of the distributing-shaft L, the rear end of which is provided with a crank, L', which gives the reciprocating motion to the pitman $L^2$ for operating the sickle-bar. The end of the pitman $L^2$ which is pivoted to the sickle-bar is supported on both of its sides, respectively, by the vertical walls of the groove $L^3$, formed in the base of the gear-frame $A^4$, which greatly improves the steadiness of its motion and also the steadiness of motion of the sickle-bar to which it is connected.

The distributing-shaft L has its bearings in the ears $L^3$ and $L^4$, projecting laterally and downwardly from the grain side of the bracket $A^2$. A cog-wheel, $l$, with diagonal teeth is affixed to the shaft L and drives the pinion $l'$, provided with corresponding diagonal teeth, which is affixed to the front end of the prime shaft M of the binding and packing mechanisms. The shaft L is also provided with a sprocket-wheel, $l^2$, for driving the sprocket-chain N, which engages and drives the sprocket-wheels N' and $N^2$. The sprocket-wheel N' is affixed to the front end of the horizontal shaft O, extending transversely across the platform and provided with a series of cranks, O' O', &c., for giving the required endwise reciprocating motion to a series of bars, O'' O'', &c., the grain ends of which are hung by means of links $O^{22}$ $O^{22}$, &c., upon the horizontal shaft $O^{33}$, supported upon the grain side of the platform-frame. To the opposite sides of each of the bars O'' there are affixed, respectively, the notched blades $O^2$ $O^2$, $O^3$ $O^3$, $O^4$ $O^4$, and $O^5$ $O^5$, which serve as the conveyers to move the cut grain along the platform toward the binding mechanism.

The sprocket-wheel $N^2$ is affixed to the horizontal counter-shaft $N^3$, from which motion is transmitted, by means of the bevel-gears $N^4$ and $N^5$, to the spider-cylinder $N^6$. Motion is also taken from the counter-shaft $N^3$ by means of the bevel-gears $N^7$ and $N^8$ to drive the vertical crank-shaft $n$, the lower end of which is provided with a crank, $n'$, the crank-pin $n^2$ of which constitutes the orbitally-moving axis of the vibrating butt-driver P, and the grain end P' of which is a vertical blade of any suitable width, while its stubble end is a stem, $p$, which plays loosely in a slot, $p'$, formed in the stationary vertical plate $p^2$, affixed to the gear-frame $A^4$. By this mode of organization the grain end or vertical blade P' of the butt-driver is made to push against the ends of the stalks of grain and to assist in pushing the butts of the grain toward the spider-cylinder.

It will be seen that those of the vibrating platform conveyers which are nearer the front of the platform are longer than those which are in the rear. The object of this is to continue the propelling action of the conveyers upon the butts of the grain after the propelling action upon the heads of the grain has ceased, so that the stalks of grain will thereby be turned into positions approximating parallelism with the axis of the diagonally-arranged spider-cylinder $N^6$, this turning of the grain upon the platform being assisted by the action of the butt-driver, as already explained.

The binder-deck Q, which is sufficiently elevated to allow space beneath it for the shafting of the packers and binder-arm, is connected with the platform by a suitably-curved shield, the lower part of which is nearly concentric with the axis of the spider-cylinder. The grain is stripped from the arms of the spider-cylinder by means of the usual stripping-fingers, Q' Q',&c., the lower ends of which lie respectively in the circumferential grooves $N^9$ $N^9$, &c., formed in the spider-cylinder. The space between the stripping-fingers Q' and the curved shield is the throat $Q^2$, through which the cut grain is elevated by the spider-cylinder. Suitably curved guard-fingers $Q^3$, immediately over the throat $Q^2$, prevent the grain from being elevated too high. The flat portion and also the curved edge of the binder-deck Q are slotted in the usual manner to allow for the movements of the packer-arms R R' and the cord-arm S.

Provision is made for insuring the stoppage of the packer-arms during the binding operation in the positions in which they are represented in Fig. 7, in which, as will be seen, neither arm projects into the throat $Q^2$, and hence does not prevent the continued upward movement of the grain toward the guard-fingers $Q^3$.

The guard of the binder-arm comes up outside the path of the packers, which are stopped, as shown in Fig. 7, so that one is below the table while the other is within the range of the binder-arm guard. This is effected by means of the ratchet-and-pawl mechanism illustrated in detail in Figs. 9, 10, 11, and 12.

The crank-shaft $R^2$, which vibrates the packers, has affixed to its front end the circumferentially-flanged disk $r$, to the inner side of which is pivoted the spring-pawl $r'$, the tail of which projects outward through a notch in the flange of the disk $r$. The spring tends to rock the pawl $r'$ so as to effect its engagement with the internal ratchets, $r^2$, formed around the wall of a recess in the face of a pinion, $r^3$. This pinion and the sprocket-wheel $r^4$, to which it is attached, turn loosely on the packer crank-shaft $R^2$ and are constantly rotated by the engagement of the pinion $r^3$ with the toothed wheel M', which is feathered on the prime shaft M of the packing and binding mechanism. So long as the pawl $r'$ continues in engagement with the internal ratchets of the pinion $r^3$ the crank-shaft $R^2$ is rotated and the packer-arms vibrated.

To disengage the pawl $r'$ from the ratchets $r^2$ the Appleby packer-trip is employed. The resistance of the collected gavel to the continued movement of the packer-arms causes the stop-lever $m$ to be rocked upon its axis, so that its pointed end $m'$ is carried down against the periphery of the disk $r$ in position to engage the tail of the pawl $r'$ when, by the rotation of the disk $r$, the side of the pawl $r'$ is brought into collision with it. This collision disengages the pawl $r'$ from the ratchets $r^2$ and arrests the rotation of the crank-shaft $R^2$, bringing the packer-arms to rest in the positions in which they are represented in Fig. 7. The pinion $r^3$ and the sprocket-wheel $r^4$ continue to revolve.

The sprocket-wheel $r^4$ is connected by the sprocket-chain $r^5$ with a sprocket-wheel, $r^6$, affixed to a counter-shaft, $r^7$, upon which is loosely mounted a disk, $r^8$, which is like the disk $r$ and to which is pivoted a pawl similar to the pawl $r'$. The disk $r^8$ has affixed to its outer side the toothed wheel $r^9$, which engages the main gear of the binder. A link, $m^2$, is pivoted at its lower end to the end $m'$ of my retaining-lever $m$ and at its upper end to the crank-arm $m^3$ of a rock-shaft carrying the retaining-pawl $m^4$.

So long as the end $m'$ of my stop-lever is elevated to the position in which it is shown in Fig. 3, so as to be out of range of the pawl $r'$, the free end of the pawl $m^4$ bears upon the periphery of the disk $r^8$ and holds the pawl with which that disk is provided out of engagement with the ratchets formed upon the face of the sprocket-wheel $r^6$; but when the end $m'$ of my stop-lever is depressed the free end of the pawl $m^4$ is rocked away from the periphery of the disk $r^8$, which permits the engagement of its pawl with the ratchet-teeth upon the sprocket-wheel $r^6$, and the consequent rotation of the disk $r^8$ and the pinion $r^9$, with which the disk $r^8$ is connected. Thus in my machine, while the first effect of the operation of the packer-trip is to set the binding mechanism in motion, the next effect is the stoppage of the packer-arms, caused by the collision of the side of the pawl $r'$ with the end $m'$ of my stop-lever, and this stoppage of the packer-arms takes place so soon after the binding mechanism has been tripped into action that there is no time for any large accumulation of grain in the upper portion of the throat, through which the grain is fed by the spider-cylinder.

The driver's seat T is supported upon the inclined spring-bar $t'$, the lower end of which is bolted to the horizontal arm affixed to the top of the beam D. The weight of the driver is thus carried on the main frame outside the drive-wheel.

I claim as my invention—

1. A main frame of a harvester, secured to the front sill of a platform between the first guard and its stubble end of the front sill, the most elevated portion being U-shaped and extending around in front of and along a portion of the outer side of the drive-wheel, in combination with a horizontal beam affixed to the outer leg of the U-shaped portion and extending backward beyond the axle of the drive-wheel at a suitable distance from the drive-wheel to afford clearance for a link or crank-arm, and a link or crank-arm secured to the stubble end of the axle of the drive-wheel, pivotally connected with the main frame and provided with a radially-extending arm, to the free end of which the windlass-chain is attached, substantially as described.

2. Devices for adjusting the counter-shaft carrying the pinion by which motion is transmitted from the drive-wheel gear relative to the drive-wheel, the same consisting, essentially, of adjusting-screws inserted radially in inclined directions through the hubs of the links, fastened, respectively, to the opposite ends of the drive-wheel axle, and having their free ends pivotally connected with the main frame and having slotted holes in their hubs for the reception of a bolt inserted through the drive-wheel axle, upon which bolt the inner ends of the said adjusting-screws bear, substantially as shown and described.

3. Mechanism for raising and lowering a harvester-platform and main frame suspended upon the drive-wheel by means of pivotal connections, with the free ends of links fastened to the opposite ends of the axle of the drive-wheel and extending forwardly and downwardly therefrom, the same consisting of the combination of a windlass-drum and shaft mounted upon a part of the main frame in the rear of the axle of the drive-wheel, and provided with the usual actuating and retaining pawls, a windlass-chain wound upon the said drum and attached to the free end of an arm projecting upwardly and rearwardly from the hub of one of the said links, an arm, $e^2$, projecting downward from one of the said links, and a chain connected with said arm and led over suitable guide-pulleys around the rear of the platform and along the grain side thereof, and having its opposite end connected to the upright arm of a bell-crank lever, all in combination with a bell-crank lever pivoted at its elbow to the grain side of the platform, and having the free end of its laterally-projecting arm fastened to the axle of the grain-wheel, substantially as shown and described.

4. Mechanism for the transmission from the drive-wheel of the power to actuate the various moving parts of the machine, consisting of a horizontal counter-shaft provided upon its grain end with a pinion engaging the drive-wheel gear, and provided at or near its stubble end with a bevel toothed wheel adapted to engage a bevel-pinion upon the rear end of a horizontal shaft projecting forward beyond the front of the main frame, and provided upon its forward end with a sprocket-wheel engaging a sprocket-chain extending across the front of the main frame to a sprocket-wheel upon the front end of an intermediate shaft, from which, by means of suitable gearing, power is distributed to the various working parts of the machine, substantially as shown and described.

5. The combination of a series of parallel endwise-reciprocating platform-conveyers of different lengths and a butt-driver vibrating upon an orbitally-moving vertical axis, with a diagonally-arranged spider-cylinder for moving the cut grain upward toward the binder-deck to a point within the range of movement of vibrating packer-arms for collecting and forming the gavel.

6. In a harvester and binder in which the tripping of the binder into action is effected by the completion of the gavel, the combination of the binder-arm provided with the usual guard, the tripping instrumentality which trips the binder into action, and the stop-lever mechanism for tripping the packer-arms out of action when they have arrived at a prescribed position in which they do not obstruct the path of the flow of grain as it is maintained by the rotation of the spider-cylinder, substantially as shown and described.

SAMUEL V. KENNEDY.

Witnesses:
GEORGE H. SWINDELLS,
GEORGE A. HANSEN.